US 11,764,644 B2

(12) United States Patent
Stautner et al.

(10) Patent No.: US 11,764,644 B2
(45) Date of Patent: Sep. 19, 2023

(54) SUPERCONDUCTING GENERATOR DRIVEN BY A WIND TURBINE

(71) Applicant: General Electric Company, Schenectady, NY (US)

(72) Inventors: Ernst Wolfgang Stautner, Niskayuna, NY (US); Mark Ernest Vermilyea, Niskayuna, NY (US); Alexander Kagan, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/295,142

(22) PCT Filed: Nov. 27, 2018

(86) PCT No.: PCT/US2018/062148
§ 371 (c)(1),
(2) Date: May 19, 2021

(87) PCT Pub. No.: WO2020/112072
PCT Pub. Date: Jun. 4, 2020

(65) Prior Publication Data
US 2022/0014072 A1     Jan. 13, 2022

(51) Int. Cl.
*H02K 7/18*     (2006.01)
*F03D 9/25*     (2016.01)
(Continued)

(52) U.S. Cl.
CPC ............ *H02K 7/1838* (2013.01); *F03D 9/25* (2016.05); *F03D 15/20* (2016.05); *H02K 9/197* (2013.01); *H02K 55/00* (2013.01)

(58) Field of Classification Search
CPC ...... H02K 7/1838; H02K 9/197; H02K 55/00; F03D 9/25; F03D 15/20
See application file for complete search history.

(56) References Cited

U.S. PATENT DOCUMENTS

| 4,088,911 A | 5/1978 | Wetzig |
| 4,439,701 A | 3/1984 | Okamoto et al. |
| 5,032,748 A | 7/1991 | Sakkuraba et al. |

(Continued)

FOREIGN PATENT DOCUMENTS

| DE | 102006011586 A1 | 9/2007 | |
| EP | 1407529 B1 * | 4/2011 | ............. H02K 55/04 |

(Continued)

OTHER PUBLICATIONS

PCT International Search Report & Opinion Corresponding to PCT/US2018/062148 dated May 9, 2019.
(Continued)

*Primary Examiner* — Viet P Nguyen
(74) *Attorney, Agent, or Firm* — Dority & Manning, P.A.

(57) ABSTRACT

A superconducting generator includes an annular armature connectable to rotate with a rotating component of a wind turbine. A stationary annular field winding is coaxial to the armature and separated by a gap from the armature. The field winding includes superconducting coils, and there is a non-rotating support for the field winding. The non-rotating support is a torque tube. The torque tube is a member formed of a composite material, or a member formed of a plurality of segmented sections, a space frame or strut torque carrying assembly. The torque tube is connected to a thermal shield casing or a field winding housing.

20 Claims, 10 Drawing Sheets

(51) Int. Cl.
*F03D 15/20* (2016.01)
*H02K 9/197* (2006.01)
*H02K 55/00* (2006.01)

(56) References Cited

U.S. PATENT DOCUMENTS

| | | | |
|---|---|---|---|
| 5,242,267 | A | 9/1993 | Byrnes et al. |
| 5,548,168 | A | 8/1996 | Laskaris et al. |
| 6,129,477 | A | 10/2000 | Shoykhet |
| 7,012,347 | B2 | 3/2006 | Kwon et al. |
| 7,462,961 | B2 | 12/2008 | Kwon et al. |
| 7,638,908 | B2 | 12/2009 | Winn et al. |
| 7,825,551 | B2 | 11/2010 | Zhang et al. |
| 8,084,909 | B2 | 12/2011 | Goodzeit et al. |
| 8,692,433 | B2 | 4/2014 | Eugene et al. |
| 9,613,751 | B2 | 4/2017 | Swaffield et al. |
| 2004/0075349 | A1 | 4/2004 | Boss et al. |
| 2008/0197633 | A1* | 8/2008 | Laskaris ............... F03D 15/20 290/55 |

FOREIGN PATENT DOCUMENTS

| | | |
|---|---|---|
| EP | 2541742 A2 | 1/2013 |
| JP | H03289344 A | 12/1991 |
| JP | 2019536419 | 12/2019 |
| WO | WO 01/52276 A2 | 7/2001 |

OTHER PUBLICATIONS

Liu et al., Design of Cold Mass Supports for a Superconducting Undulator Prototype at SINAP, IEEE Transactions on Applied Superconductivity, vol. 25, Issue 3, Jun. 2015, pp. 1-4.

Sivasubramaniam et al., AC losses in a high temperature superconducting generator, IEEE Transactions on Applied Superconductivity, vol. 15, Issue 2, Jun. 2005, pp. 2162-2165.

Foreign office action for JP application No. 2021-526761.

EP Office Action for EP application No. 18816398.4, dated Feb. 6, 2023, 10 pages.

* cited by examiner

US 11,764,644 B2

SUPERCONDUCTING GENERATOR DRIVEN BY A WIND TURBINE

BACKGROUND

This invention relates to electrical generators and, particularly, relates to wind turbines and superconducting generators.

A direct drive generator driven by the blades of the wind turbine is efficient and has minimal losses due to transmission of torque from the turbine blades to the DC generator. Direct drive conventional generators on wind turbine towers generally have a power rating of 6 megawatts (MW) or less.

Conventional direct drive generators typically have low torque density and become too heavy for a wind turbine tower at power ratings above about 6 MW. Gearboxes may be unreliable and not suitable for long life service in a wind turbine.

In addition, alternating current (AC) wind generators must undergo total power conversion to convert the generated power to 50-60 cycle AC at a particular voltage desired by the grid connection. This conversion is typically accomplished by a power electronics (PE) converter consisting of a rectifier in the first stage to convert the AC to direct current (DC) and then an inverter stage to produce the desired AC.

There is a long felt need for direct drive generators for wind turbines capable of generating higher electrical power, e.g., 10 MW or more. In addition, there is a need for a DC generator which allows the up-tower weight to be reduced, thereby providing reductions in cost, size and weight, which allow for economical shipping and installation on a wind turbine tower and concomitant reliability increase.

BRIEF DESCRIPTION

In one aspect, a superconducting generator includes an annular armature connectable to rotate with a rotating component of a wind turbine. A stationary annular field winding is coaxial to the armature and separated by a gap from the armature. The field winding includes superconducting coils, and there is a non-rotating support for the field winding. The non-rotating support is a torque tube. The torque tube is a member formed of a composite material, or a member formed of a plurality of segmented sections, a space frame or strut torque carrying assembly. The torque tube is connected to a thermal shield casing or a field winding housing.

In another aspect, a wind turbine includes a tower, a nacelle mounted on top of the tower, a hub connected to the nacelle and supported by the tower, and a plurality of blades connected to the hub. A superconducting generator is housed within the nacelle. The superconducting generator includes an annular armature connectable to rotate with a rotating component of a wind turbine. A stationary annular field winding is coaxial to the armature and separated by a gap from the armature. The field winding includes superconducting coils, and there is a non-rotating support for the field winding. The non-rotating support is a torque tube. The torque tube is a member formed of a composite material, or a member formed of a plurality of segmented sections, a space frame or strut torque carrying assembly. The torque tube is connected to a thermal shield casing or a field winding housing.

These and other features and improvements of the present disclosure will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings.

DETAILED DESCRIPTION

A superconducting direct current (DC) generator has been developed with a stationary, or non-rotating, field winding and a rotating armature driven directly by a turbine, such as a wind turbine. The superconducting DC generator may be mounted in the upper region of wind turbine tower and coupled directly to the rotating component of the wind turbine, e.g., the blades. The direct drive generator is sufficiently lightweight to be mounted on top of a wind turbine tower and coupled to rotating wind turbine blades via the hub.

The superconducting DC generator provides high torque density, which allows the DC generator to be lightweight and transportable, despite the added components needed to cool and insulate the superconducting coils in the field winding. The stationary field winding includes a series of racetrack shaped superconducting coils cooled to cryogenic temperatures. The rotating armature and iron yoke (optional)

are connected directly to and turned by the wind turbine. A commutator assembly transfers the current generated by the rotating armature to conductors that may extend down through the frame of the wind turbine.

Figure 1:
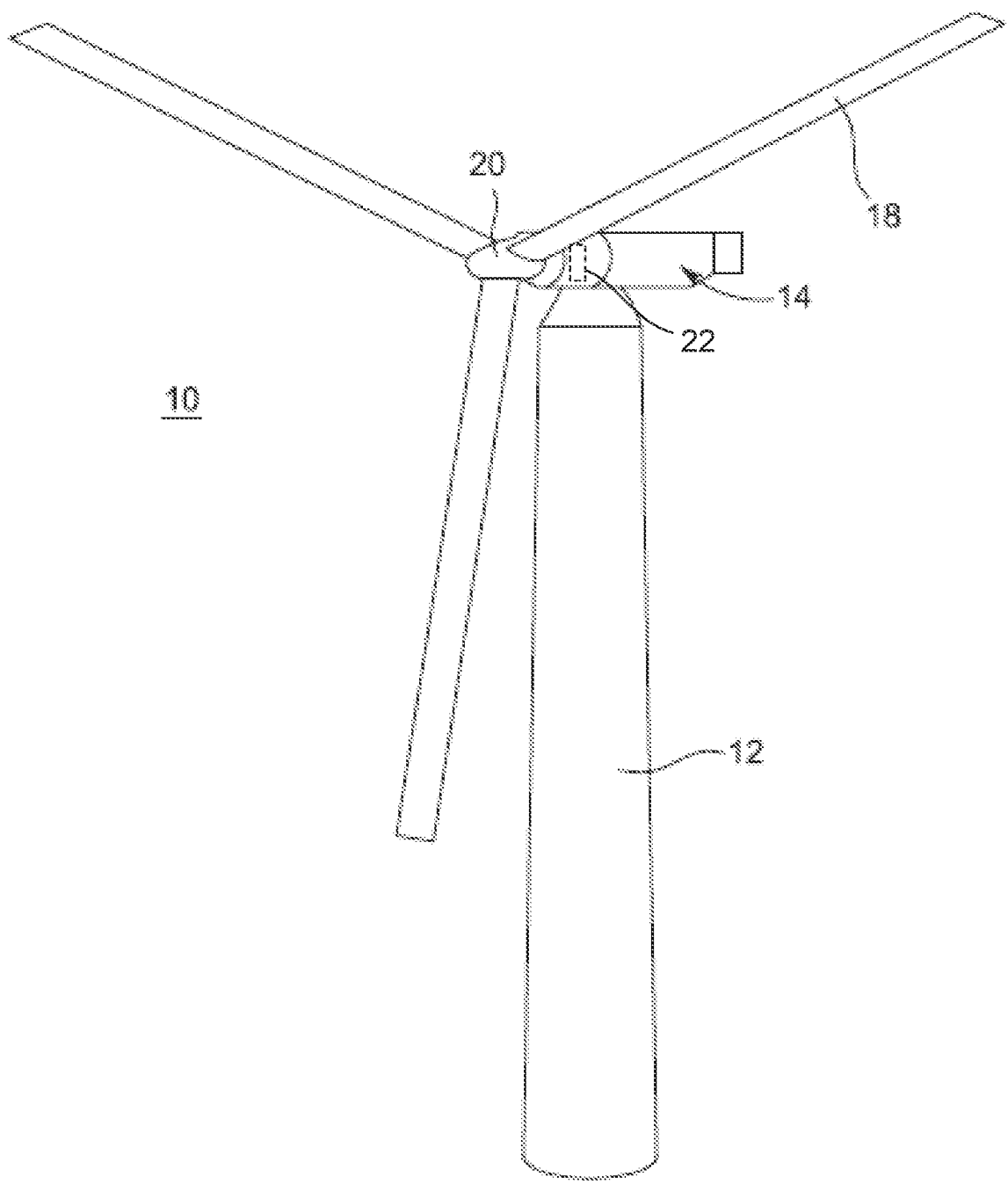
FIG. 1 illustrates a wind turbine having a direct drive, direct current (DC) generator with superconducting electromagnetic components.

FIG. 1 is a front view of a wind turbine 10 that includes a tower 12 anchored to the ground. A superconducting DC generator 22 is housed within a nacelle 14 mounted on top of the tower. The nacelle may rotate about an axis of the tower to align the turbine blades 18 with respect to the wind direction. The blades extend radially outward from a hub 20. The blades 18 typically face into the wind and are turned by the energy of the wind. The DC generator 22 is housed within the nacelle 14 and is driven directly by the hub 20 and blades 18. The rotation of the blades and hub directly drives the armature of the DC generator.

As one example only, the tower 12 may be between 20 and 150 meters in height, one to two (1 to 3) meters in diameter at the top and four (5) meters in diameter at the ground base. The tower may be constructed of tapered tubular steel, but may also be made from a lattice structure or from concrete sections. The turbine blades 18 are equally spaced around the hub 20, and the resulting rotor diameter may be about 20 meters to about 180 meters or more. While the blades may be made of any suitable material, they are typically formed of a carbon or glass fiber reinforced plastic or epoxy. The blades may have a fixed pitch or a variable pitch, depending on whether a variable pitch gearbox is included in the hub. The dimensions of the tower and blades and their compositions may be chosen as desired in the specific application.

Figure 2:
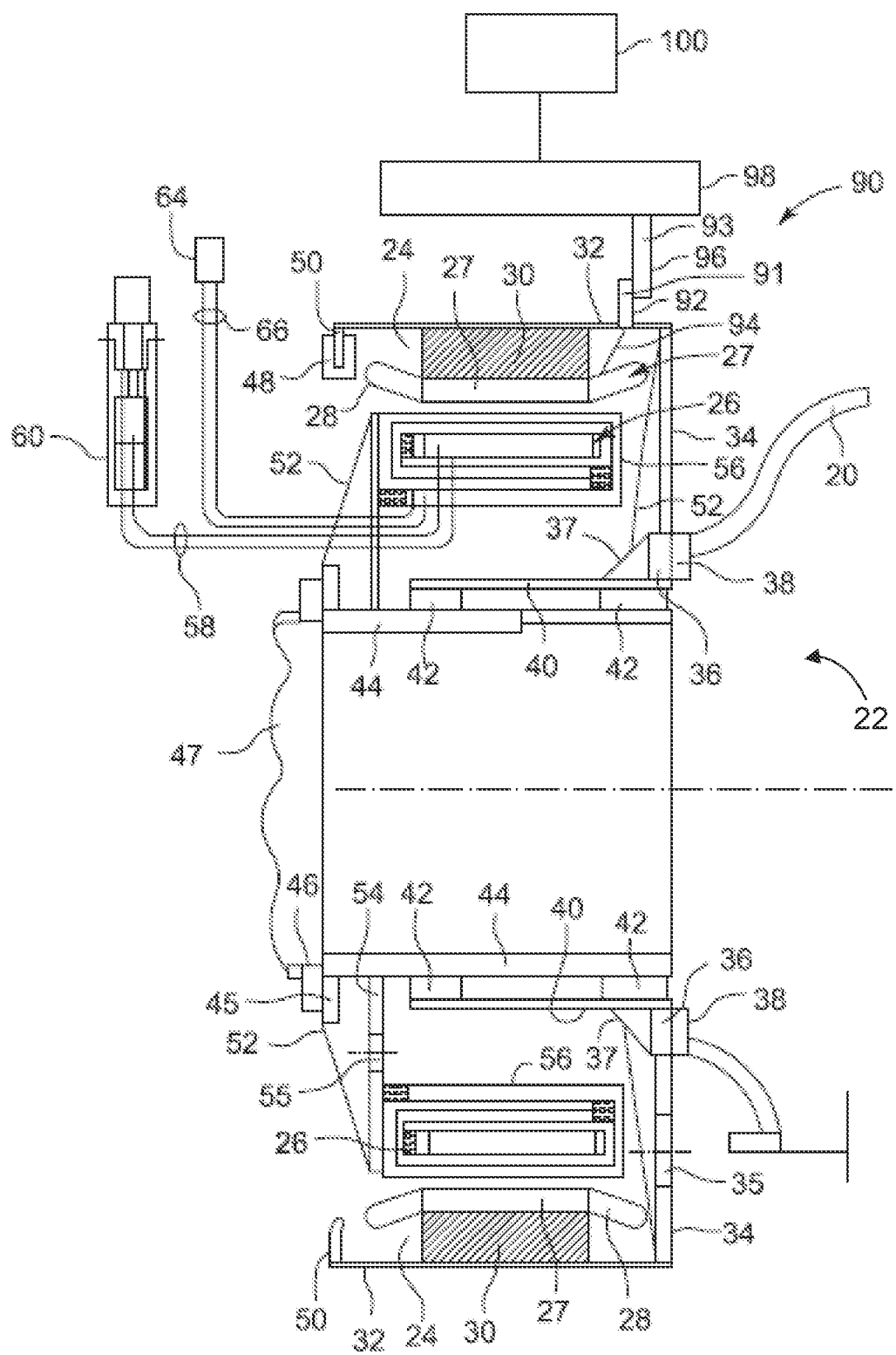
FIG. 2 illustrates a schematic diagram showing in cross-section a direct drive DC generator having an annular rotating armature and a stationary super-conducting field winding surrounded by the armature.

FIG. 2 is a schematic diagram showing in cross-section a direct drive generator 22 having an annular rotating armature 24 and a stationary superconducting field winding assembly 26 surrounded by the armature. The rotating armature 24 is an outer annular ring around the field winding assembly 26. The armature 24 may comprise conductive windings 27, e.g., coils or bars, arranged longitudinally (axially) along the length of the armature and on an inside cylindrical surface of the armature. By way of example, the longitudinal sections of the armature windings may be 36 to 72 inches in length, have a thickness of 4 to 5 inches and an inside diameter of between 135 to 136 inches. The coils or bars may be connected at their opposite ends to one another by conductive end turns 28. The end turn connections between the longitudinal coils or bars are dependent on their number and arrangement, and the phases of electricity to be generated in the armature windings. The inside cylindrical surface of the armature windings is separated by a narrow air gap, e.g., about 1-2 inches, from the outer surface of the stationary superconducting field winding assembly 26.

The annular rotating armature 24 includes a cylindrical yoke 30 that supports the coils and bars 27. The outer surface of the yoke 30 is fixed to a cylindrical housing 32 that rotates with the armature. The diameter of the housing 32 may be, for example, between 20 to 30 feet and have an axial length of 6 feet. The housing is fitted to a circular disc 34 that supports the housing and armature 24. The disc has a circular aperture at its center that is mounted to an annular bracket 36 to which is attached the annular base 38 of the hub 20 of the wind turbine. The bracket 36 and base 38 may be secured together by bolts arranged in a circular array around the bracket and base. The disc 34 may have optional openings or holes 35 for weight reduction. The bracket 36 is mounted on an end of a rotating cylindrical support tube 40 that is radially inward of the armature winding. A reinforcing ring 37 may be fixed to the inner corner between the bracket 36 and support tube 40. The support tube 40 may be, for example, between 7 to 10 feet in diameter.

To convert the generated mechanical energy into DC electrical energy, as the rotating armature 24 turns, the current in the armature coils 27 is commutated to produce a direct current output by a commutator assembly 90. In the illustrated example, the commutator assembly 90 is configured as a plurality of circumferential rings proximate an outside surface of the housing 32 or circular disc 34. The commutator assembly 90 may be disposed at any convenient location exterior the rotating housing 32. Positioning of the commutator assembly 90 closer to the axis of rotation will allow shorter circumferences. The commutator assembly 90 is generally comprised of a rotating first portion 91 that rotates with the rotating armature 24 as it turns and a stationary second portion 93 that remains stationary. The commutator assembly 90, and more particularly the rotating first portion 91 is comprised of a plurality of conductive segments 92, formed of a material such as copper. In this example, the commutator assembly 90 is comprised of at least two rotating commutator segments 92. The commutator segments 92 are configured to rotate with, and are electrically connected to, the rotating armature coils 27 via a plurality of electrical connections 94. The number of segments and electrical connections are variable and determined by the number of electrical poles selected by the generator designer. The stationary second portion 93 of the commutator assembly 90 is completed by a fixture holding a plurality of commutator brushes 96, and in this particular embodiment, at least two commutator brushes 96. The commutator brushes 96 are typically comprised of carbon, remain stationary, and are held by a stationary platform 98 configured to take an output current from the commutator brushes 96 to a power conversion system 100. The commutator brushes 96 are configured to ride or brush on the rotating commutator segments 92 as they rotate. The commutator brushes 96 may be held in position by way of spring tension, and may include grounded and ungrounded brushes. As electrical energy is generated, the energy is conducted through the commutator brushes 96 and the rotating commutator segments 92 to the stationary platform 98, and ultimately to the power conversion system 100 that is coupled to a power utility grid, factory or other electrical power load so that the electricity can be used.

Figure 3:
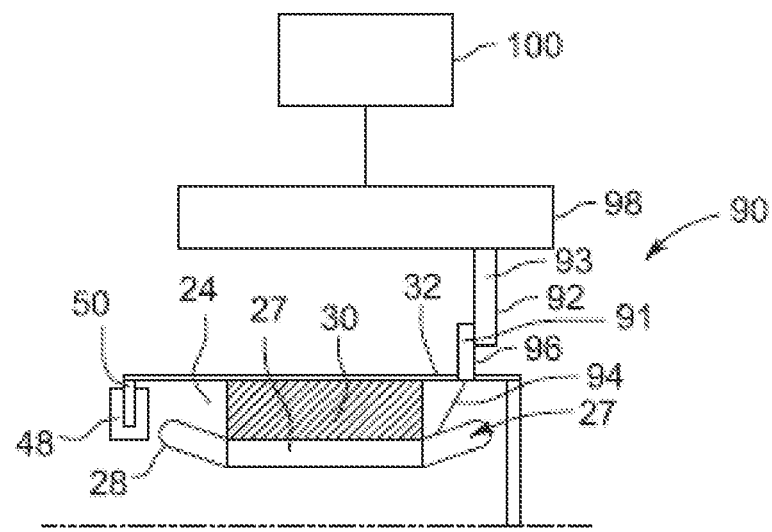
FIG. 3 illustrates schematic diagram showing in cross-section the rotating armature for the superconducting field winding.

In an alternative example, as best illustrated in a partial schematic cross-section view in FIG. 3, the rotating first portion 91 of the commutator assembly 90 that rotates with the rotating armature 24 may be comprised of the plurality of commutator brushes 96 and the stationary second portion 93 of the commutator assembly 90 that remains stationary, may be comprised of the plurality of commutator segments 92. In this alternative embodiment, the plurality of rotating commutator brushes 96 are configured to ride or brush on the stationary commutator segments 92 as they rotate. Similar to the reverse configuration previously disclosed for the first and second portions 91, 93 of the commutator assembly 90, as electrical energy is generated, the energy is conducted through the commutator segments and the rotating commutator brushes to the stationary platform 98, and ultimately to the power conversion system 100 that is coupled to a power utility grid, factory or other electrical power load so that the electricity can be used.

Referring back to FIG. 2, a pair of annular bearings 42 arranged on opposite ends of the support tube 40 rotatably support the support tube 40 on a stationary base tube 44 is attached to a mount 47 that is supported by the floor of the nacelle. A ring bracket 46 may attach mount 47 to a bracket 45 for the base tube. Bolts secure the brackets 45, 46 together. The pair of bearings 42 may be of the same type. Alternatively, the annular bearing 42 near the hub 20 may have a longer length, e.g., 15 to 30 inches, than the annular bearing 42 near the tower, which may have a length of 8 to 16 inches. The bearing 42 near the hub is longer because it more directly receives the downward force of the hub and blades and wind, which may be 500,000 pounds of force, and receives a bending moment from the hub, blades and wind, which moment may be $127 \times 10^6$ inch-pounds at the base 38 and bracket 36.

The support tube 40 may have constant thickness along its length. Alternatively, the base tube 44 may be thick, e.g., two inches, near the tower and thin, e.g., one inch, near the hub. The base tube may reduce in thickness in a step or a taper. The reduction in the thickness reduces the weight of the tube. Similar weight reducing features may include cutouts or holes in the disc 34, light weight materials, e.g., composites, in the housing 32. A disc brake 48 grasps an annular lip 50 on an end of the housing 32. The brake can slow or stop the rotation of the blades, if the wind becomes excessive and the blades rotate too fast. Thin and lightweight gussets 52 extend from circular disc 34 to the support tube 40. The gussets structurally reinforce the disc 34.

The base tube 44 supports a field winding support disc 54 on which is mounted the stationary field winding assembly 26. The field windings 26 are a series of conductive loops (or coils) through which current circulates, and once a current (or voltage) is ramped up to a desired level the cold superconducting temperature of the windings permits the current to circulate with zero resistance. This circulating current acts as a magnet to impose a magnetic field in the armature windings. The assembly of the base tube 44 and support disc 54 is an exemplary non-rotating support for the field winding assembly 26. The disc may have cutouts or holes 55 to reduce weight. The disc 54 is attached to an end of a cryostat housing 56 containing the superconducting coils of the field winding 26. The housing 56 and its cooling components form a cryostat that cools the superconducting coils of the field winding. The housing for the cryostat 56 may be annular, rectangular in cross section, have an outside diameter of between 10 to 20 feet, and a length of 4 to 5 feet. The dimensions of the housing 56 and other components of the DC generator and wind turbine are a matter of design choice and may vary depending on the design of the wind turbine.

The cryostat 56 insulates the superconducting coils so that they may be cooled to near absolute zero, e.g., to 10 Kelvin (K) and preferably to 4K. To cool the windings, the housing 56 includes insulated conduits 58 to receive liquid helium (He) or other similar cryogenic liquid (referred to as cryogen). A two-stage re-condenser 60 mounted in an upper region of the nacelle, on top of the nacelle or on top of the tower, and above the field windings provides cryogen, e.g., liquid He, using a gravity feed. The cryogen flows around the superconducting coil magnets of the field windings and cools the coil magnets to achieve a superconducting condition. The coils are cooled, e.g., to 4 degree K, as the He at least partially vaporizes. The He vapor flows through one of the conduits 58 to the re-condenser 60, where the He is cooled, liquefied and returned via conduit 58 to the coils magnets. The power conductors for the superconducting coils also pass through the housing 56 with the insulated conduits 58 for the helium.

Torque is applied by the hub 20 to turn the rotating armature 24 around the stationary super-conducting field winding assembly 26. The rotating support disc 34 transmits the torque from the hub to the rotating armature 24. Torque is applied by the rotating armature 24 to the stationary super-conducting field winding assembly 26 due to electro-magnetic force (EMF) coupling. The torque applied to the stationary super-conducting field winding assembly 26 is transmitted by the field winding housing 56 to the stationary support disc 54 and to the mount 47 of the tower 12.

Figure 4:
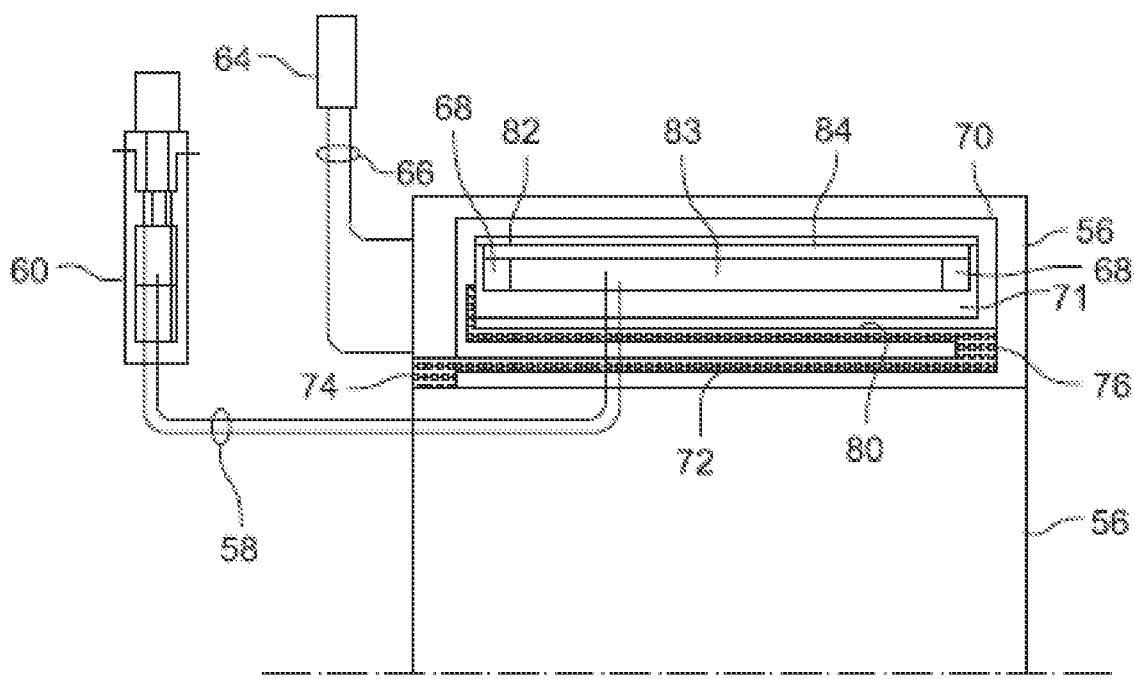
FIG. 4 illustrates a schematic diagram showing in cross-section a portion of the cryostat for the superconducting field winding.

Referring to FIG. 4, the interior of the housing 56 is evacuated and that forms an insulating vacuum around the thermal shield 70. A first torque tube 72 suspends the thermal shield 70 in the evacuated interior of the cryostat housing 56. The torque tube 72 is mounted to an annular flange 74 inside the housing. The flange elevates the tube from the inside wall of the housing 56. Another annular flange 76, at the opposite end of the torque tube 72, elevates the thermal shield 70 from the tube and centers the thermal shield inside the housing 56. The torque tube 72 also transmits torque from the thermal shield 70 to the housing 56, and provides thermal insulation to the low temperature thermal shield from the ambient temperature housing 56. The thermal shield 70 is preferably formed of a lightweight material. Suspended in the thermal shield 70 is an annular casing 71.

A second torque tube 80 is supported on one end by a flange 76 on an inner wall of the thermal shield 70. The flange 76 may extend into the interior of the chamber defined by the thermal shield 70 or may comprise two flanges (one inside the thermal shield and the other outside the thermal shield). The flanges may be formed of an insulating material. The second torque tube 80 thermally insulates and suspends the annular casing 71 from the thermal shield. The second torque tube 80 transmits torque from the coils to the first torque tube 72. Both the first and second torque tubes may be formed of lightweight materials. The torque tube is an essential structural component of a superconducting generator. The torque tube reacts to electro-magnetic torque, which is generated by interaction with the rotating armature coils by transferring torque into the external structure and eventually to the wind turbine tower. The torque tube also carries the static weight of the cooled field structure and thermal shield, and it minimizes conduction heat loads to the superconducting coils and thermal shield.

The insulated power cables 58, 66 for the superconducting coils 68 pass through sealed apertures in the housing 56, thermal shield 70 and, for the first conduit 58 to the casing 71 for the superconducting coils. The housing, thermal shield, and casing provide an insulated and cooled environment within which the superconducting coils can be cooled to cryogenic temperatures, e.g., 4 degree Kelvin. The torque tubes arranged in opposite directions thermally and mechanically isolate the windings and their casings from ambient conditions. The casing may be annular and rectangular in cross section. The curvature of the casing conforms to the curvature of the annular chamber 70. The casing 71 may include an annular array of hollow recesses 83 that each receive a race-track shaped coil 68 and a supply of liquid helium. A support bracket 82 is seated in the recess and above each coil magnet.

Figure 5:
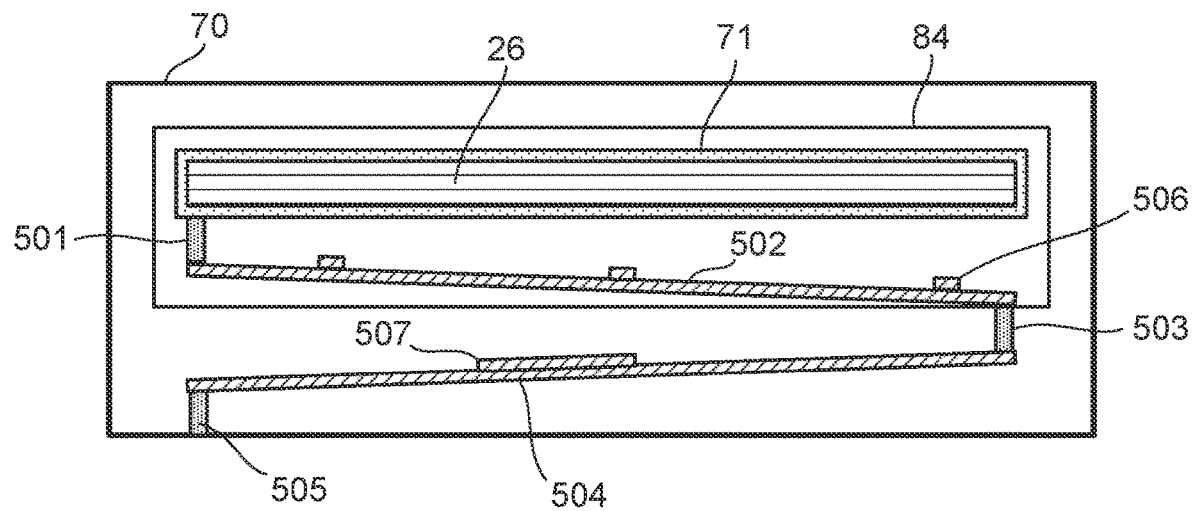
FIG. 5 illustrates a simplified schematic diagram showing in cross-section a portion of the cryostat for the superconducting field winding, according to an aspect of the present disclosure.

FIG. 5 illustrates a simplified schematic diagram showing in cross-section a portion of the cryostat for the superconducting field winding, according to an aspect of the present disclosure. The cryostat comprises the annular chamber 70 and a cylindrical shell 84 is disposed around a casing 71 and field windings 26. A thermal resistant support 501 is connected to a torque tube 502. A second thermal resistant support or thermal anchor point 503 is connected to a second torque tube 504, and this second torque tube 504 is anchored to the annular chamber via a third thermal resistant support 505. The first and second torque tubes 502, 504 are comprised of frustoconical shaped members, which are generally a truncated cone shape. The torque tubes 502, 504 may have stiffening ribs 506, 507 incorporated therein to increase the circumferential and axial rigidity of the torque tubes. The stiffening ribs may extend circumferentially and/or axially along the torque tubes. In FIG. 5, the circumferential direction would be into or out of the page along an arc, and the axial direction is generally horizontal to the left or right.

Figure 6:
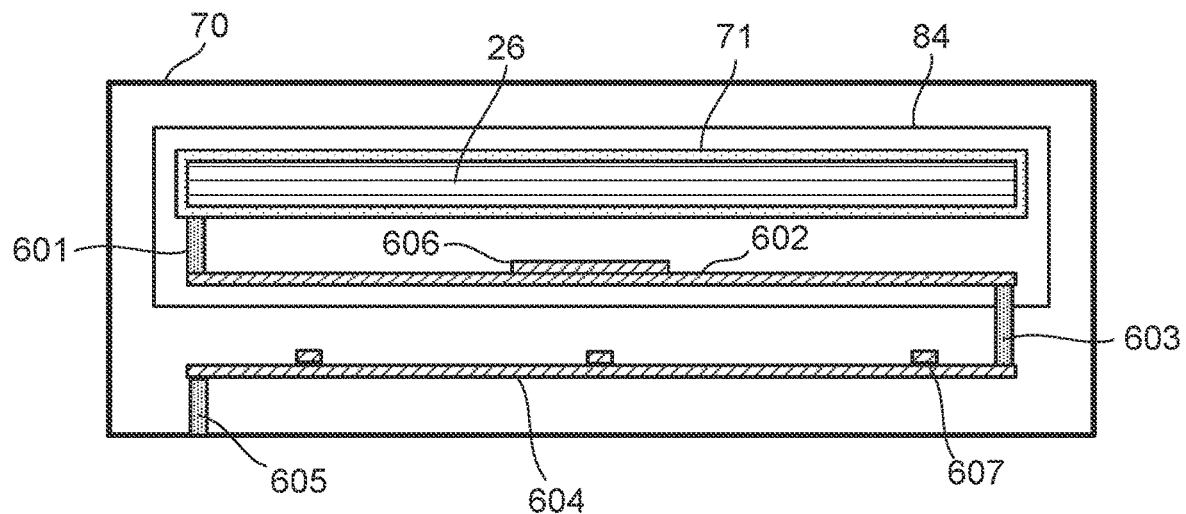
FIG. 6 illustrates a simplified schematic diagram showing in cross-section a portion of the cryostat for the superconducting field winding, according to an aspect of the present disclosure.

FIG. 6 illustrates a simplified schematic diagram showing in cross-section a portion of the cryostat for the superconducting field winding, according to an aspect of the present disclosure. The cryostat comprises the annular chamber 70 and a cylindrical shell 84 is disposed around a casing 71 and field windings 26. A thermal resistant support 601 is connected to a torque tube 602. A second thermal resistant support 603 is connected to a second torque tube 604, and this second torque tube 604 is anchored to the annular chamber via a third thermal resistant support 605. The first and second torque tubes 602, 604 are comprised of cylindrical or generally cylindrical shaped members. The torque tubes 602, 604 may have stiffening ribs 606, 607 incorporated therein to increase the circumferential and axial rigidity of the torque tubes.

The torque tubes may be comprised or formed of a composite material, such as, a fiber reinforced plastic, an epoxy fiberglass laminate, a phenolic fiberglass laminate, a phenolic fiberglass with wound filaments, a polyester fiberglass laminate, a polyester fiberglass laminate with wound filaments, a polymide fiberglass laminate, a carbon epoxy, or a fiberglass epoxy laminate. In some known superconducting generators, metal (e.g., titanium) torque tubes were employed or investigated for use. However, titanium has substantially better thermal transfer properties than fiberglass epoxies, and that quality is not desired in superconducting generators. In fact, the opposite is desired, and a thermally insulative material would be more desired to maintain the cold temperatures in the annular chamber. The composite materials identified above can provide sufficient rigidity to resist torsional buckling, and also exhibit satisfactory fatigue resistance at cold temperatures, while also having low thermal transfer properties.

Figure 7:
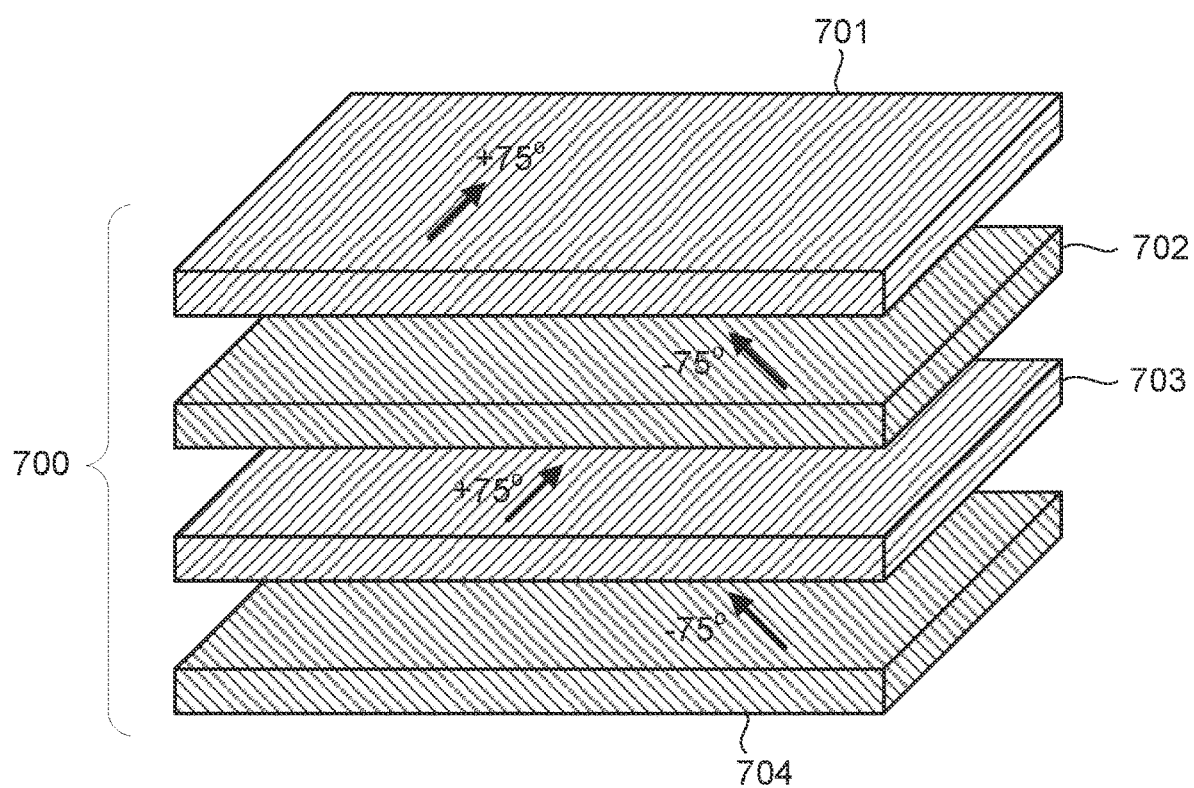
FIG. 7 illustrates a partial exploded view of a torque tube, according to an aspect of the present disclosure.

FIG. 7 illustrates a partial exploded view of a torque tube 700, according to an aspect of the present disclosure. The torque tube 700 is constructed of a composite material having a plurality of layers (only four of which are shown for clarity). It is to be understood the number of layers may be more than one and up to any desired number as desired in the specific application. The layers 701-704 are comprised of hoop oriented fibers oriented at + or −75 degrees. The degrees are measured from a radial plane at a single axial distance, with respect to the generator. For example, layers 701 and 703 have fibers oriented at +75 degrees, and layers 702 and 704 have fibers oriented at −75 degrees. The fiber angles provide a good balance of providing structural rigidity and also providing a longer thermal conduction path to opposing ends of the torque tube. The fiber angles may also range between about + or −65 degrees to about + or −85 degrees.

Figure 8:
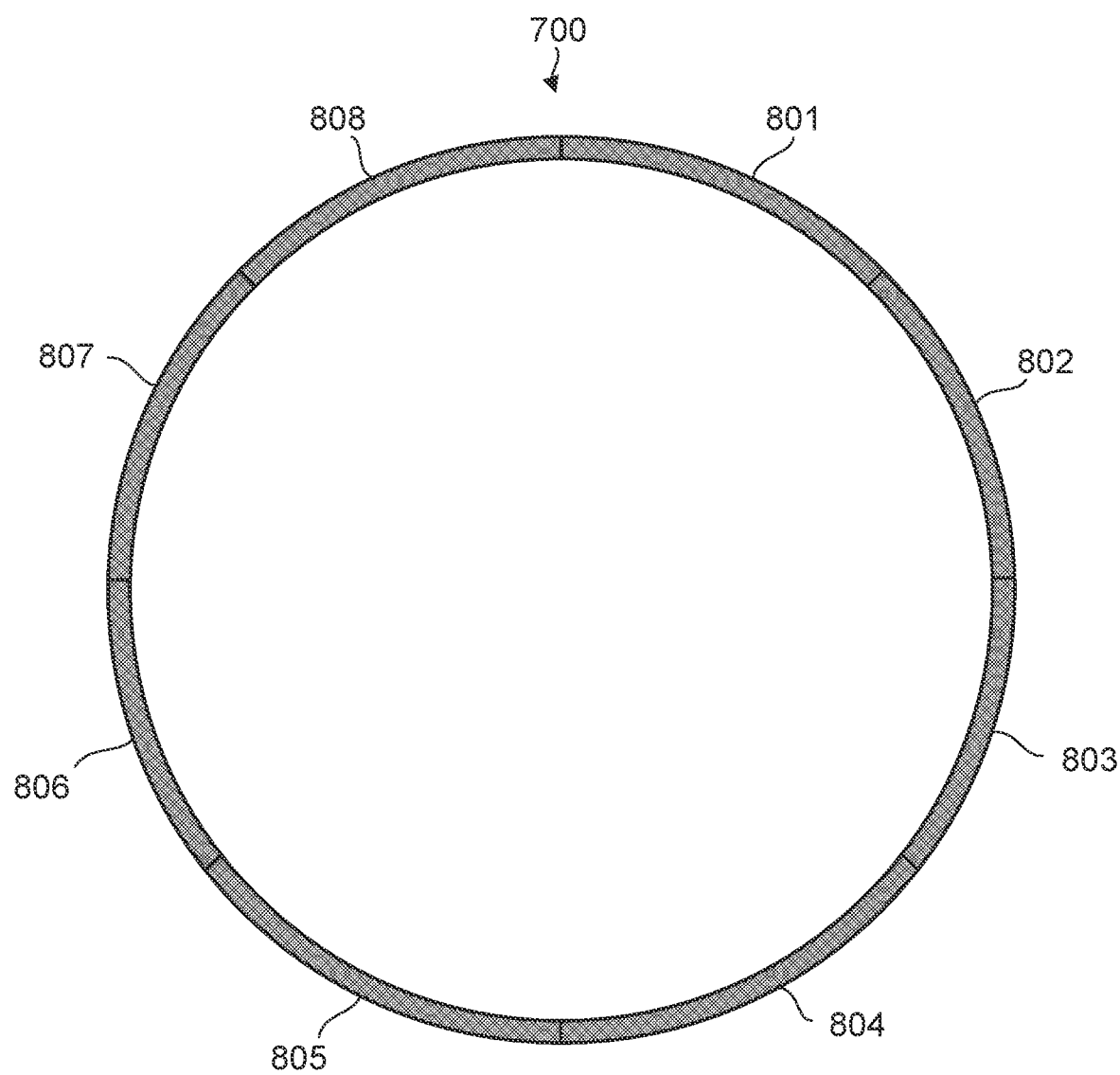
FIG. 8 illustrates a cross-sectional view, in a radial plane, of a torque tube formed from a plurality of segmented sections, according to an aspect of the present disclosure.

FIG. 8 illustrates a cross-sectional view, in a radial plane, of a torque tube 700 formed from a plurality of segmented sections. The torque tube 700 is a generally cylindrical or frustoconical member, which is formed of a plurality of segmented sections 801-808 joined together. Each of the sections 801-808 is formed of an arcuate plate, and when they are joined together form the cylindrical torque tube shown in FIG. 8. Preferably, the material of each section is a composite laminate, however, metallic materials/alloys may be used if desired and determined suitable for the desired application.

Figure 9:
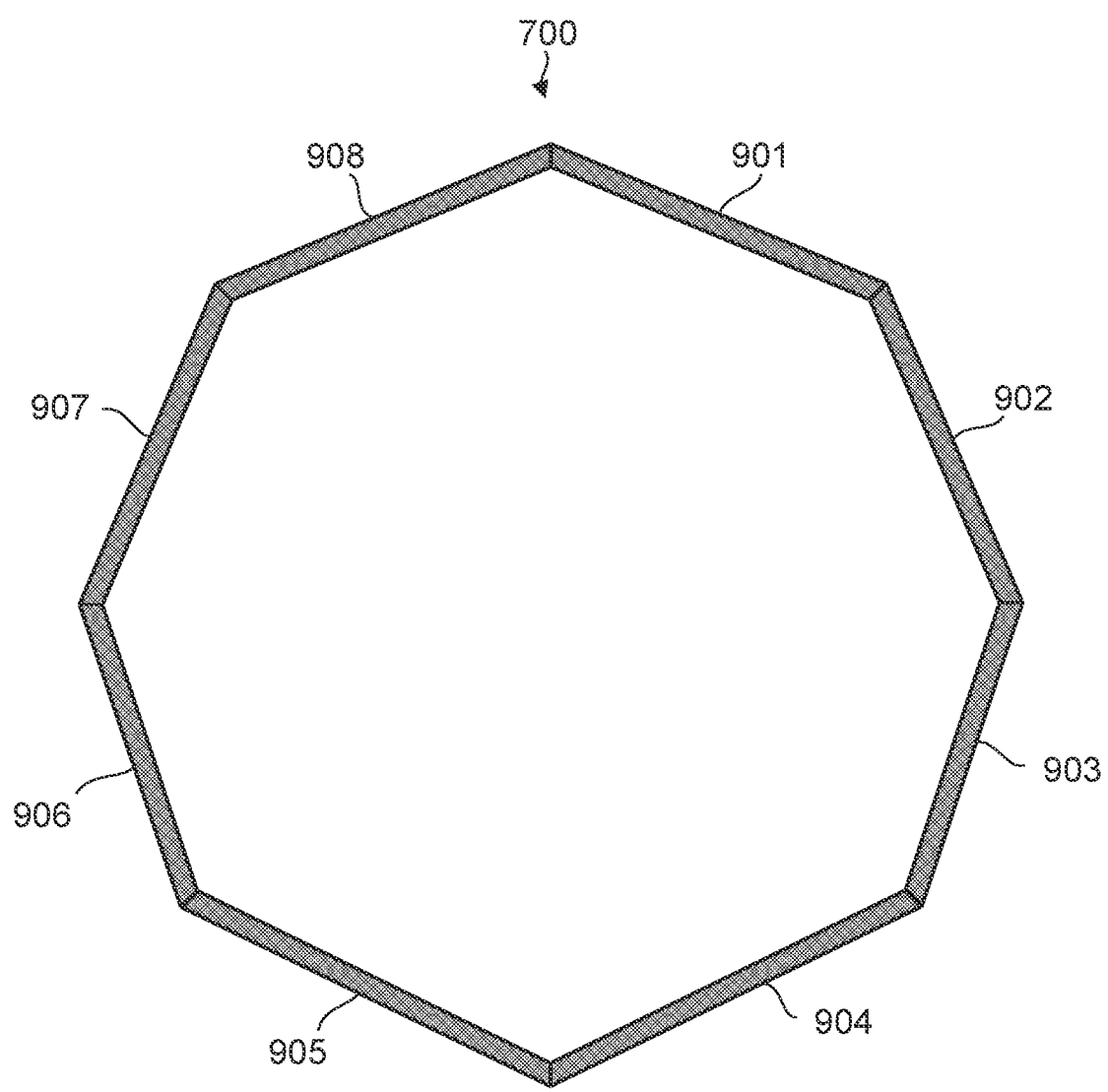
FIG. 9 illustrates a cross-sectional view, in a radial plane, of a torque tube formed from a plurality of segmented sections, according to an aspect of the present disclosure.

FIG. 9 illustrates a cross-sectional view, in a radial plane, of a torque tube 700 formed from a plurality of segmented sections. The torque tube 700 is a generally cylindrical, polygonal or frustoconical member, formed of a plurality of segmented sections 901-908 joined together. Each of the sections 901-908 is formed of a flat plate, and when they are joined together form the generally cylindrical or polygonal torque tube shown in FIG. 9.

Figure 10:
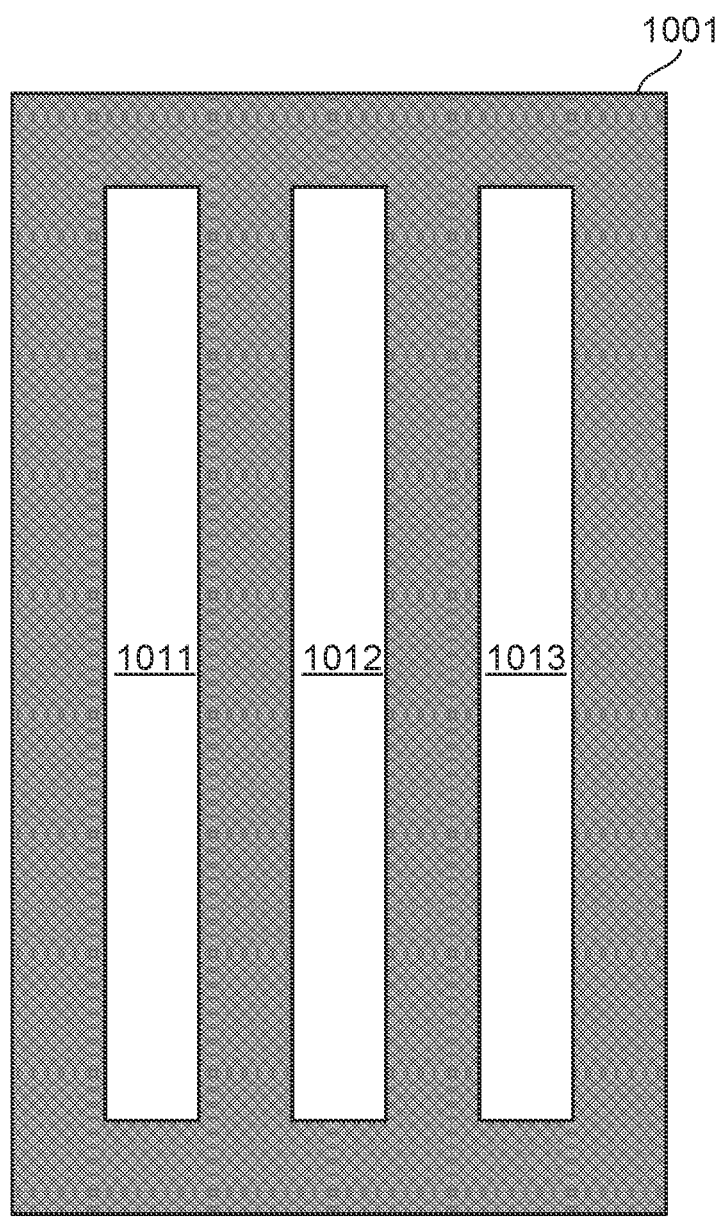
FIG. 10 illustrates a plan view of a torque tube section, according to an aspect of the present disclosure.

FIG. 10 illustrates a plan view of a torque tube section, according to an aspect of the present disclosure. Section 1001 may be any one (or all) of segmented sections 801-808 or 901-908 of FIGS. 8-9. Section 1001 may be a profiled plate or a hollow tube or an arcuate plate and includes one or more apertures 1011-1013 formed in the main body of the section. The apertures 1011-1013 serve multiple functions. First, they provide access windows to the windings 26 housed in casing 71. Secondly, the apertures 1011-1013 reduce the overall weight of the torque tube, as material has been removed to create the apertures. Thirdly, the apertures 1011-1013 decrease heat transfer along the axial section thereof, due to the reduced cross-sectional area created by the apertures.

Figure 11:
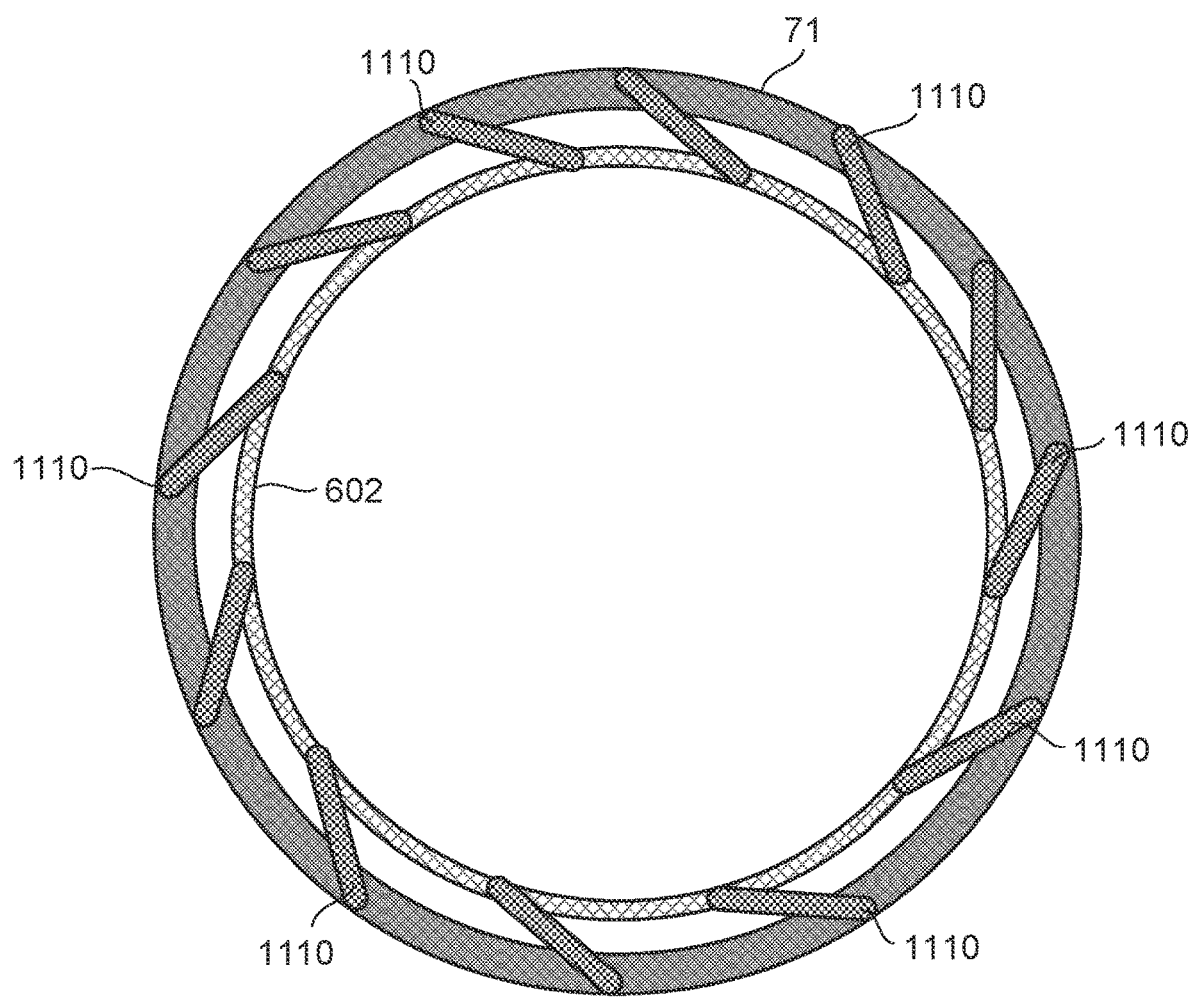
FIG. 11 illustrates a cross-sectional view in a radial plane of a multi-strap torque carrying assembly, according to an aspect of the present disclosure.

FIG. 11 illustrates a cross-sectional view in a radial plane of a multi-strap torque carrying assembly, according to an aspect of the present disclosure. The field coil casing 71 is connected to a plurality of straps 1110, which are in turn connected to the torque tube 602. The plurality of straps 1110 function to support axial and transverse or circumferential loads. An additional set of straps 1110 (not shown) may be used to connect the first torque tube 602 to the second torque tube 604 (not shown).

Figure 12:
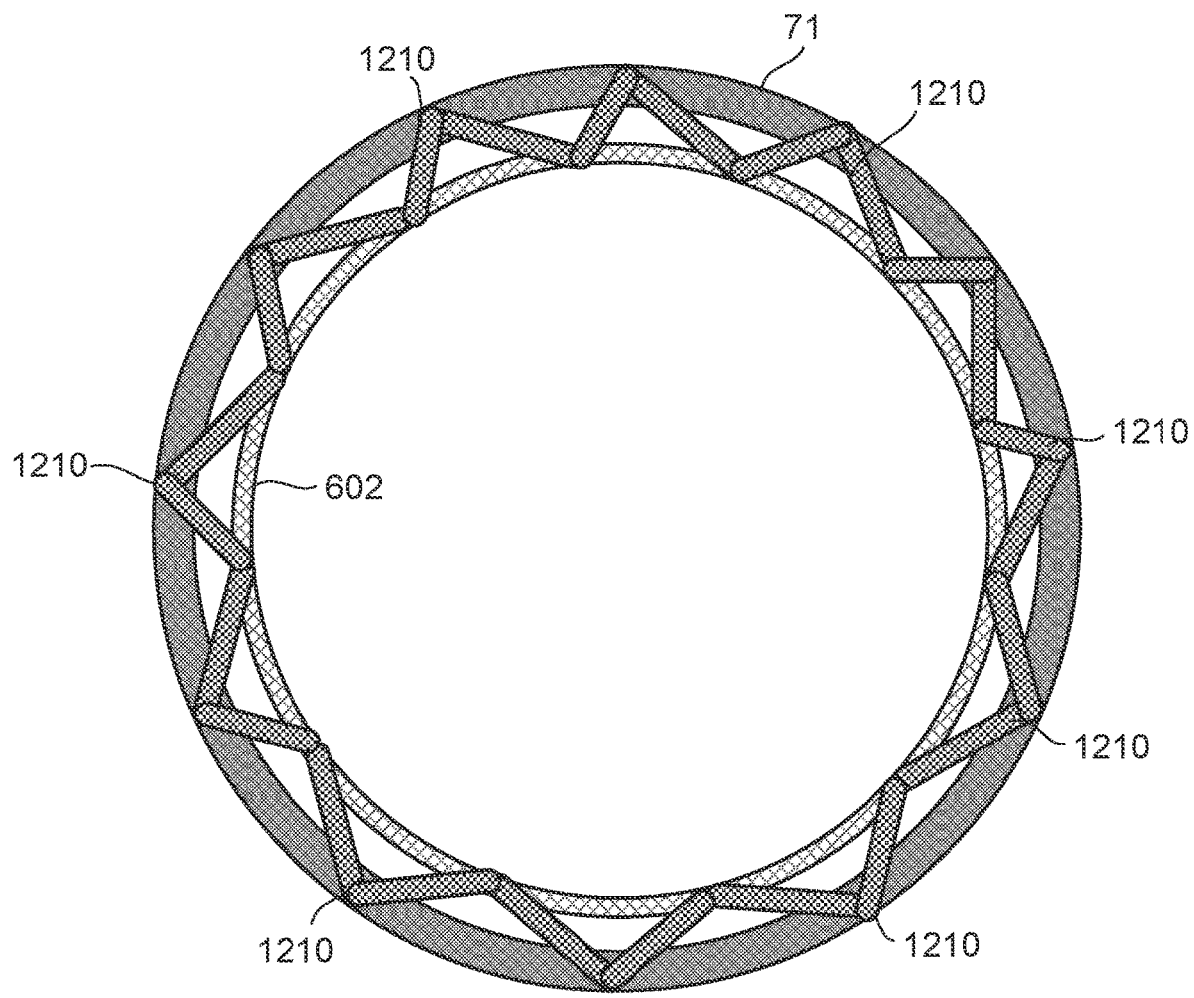
FIG. 12 illustrates a cross-sectional view in a radial plane of a space frame or strut torque carrying assembly, according to an aspect of the present disclosure.

FIG. 12 illustrates a cross-sectional view in a radial plane of a space frame or strut torque carrying assembly, according to an aspect of the present disclosure. The field coil casing 71 is connected to a plurality of struts 1210, which are in turn connected to the torque tube 602. The plurality of struts 1210 function to support axial and transverse or circumferential loads. An additional set of struts 1210 (not shown) may be used to connect the first torque tube 602 to the second torque tube 604 (not shown). The space frame or strut structure (composed of struts 1210) is a rigid, lightweight, truss-like structure constructed from interlocking struts in a geometric pattern (e.g., triangular). A space frame carrying assembly is strong because of the inherent rigidity of the triangle, as flexing loads are transmitted as tension and compression loads along the length of each strut 1210.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A superconducting generator comprising:
   an annular armature connectable to rotate with a rotating component of a wind turbine;

a stationary annular field winding coaxial to the armature and separated by a gap from the armature, wherein the field winding includes superconducting coils;

a non-rotating support for the field winding, the non-rotating support comprising a torque tube, the torque tube comprised of:

a plurality of segmented sections joined together;

a flange located on at least one axial end of the torque tube; and wherein the torque tube is connected to a thermal shield casing or a field winding housing by a plurality of members separate from the flange and spaced apart circumferentially around the torque tube.

2. The superconducting generator of claim 1, wherein the torque tube comprises a generally cylindrical shaped member.

3. The superconducting generator of claim 1, wherein the torque tube comprises a frustoconical shaped member.

4. The superconducting generator of claim 1, wherein the segmented sections are formed of a composite material, and the composite material is mixtures of or one of:
- a fiber reinforced plastic;
- an epoxy fiberglass laminate;
- a phenolic fiberglass laminate;
- a phenolic fiberglass with wound filaments;
- a polyester fiberglass laminate;
- a polyester fiberglass laminate with wound filaments;
- a polymide fiberglass laminate;
- a carbon epoxy; or
- a fiberglass epoxy laminate.

5. The superconducting generator of claim 4, wherein the composite material has a hoop oriented fiber pattern with angles oriented at about 65 degrees to about 85 degrees.

6. The superconducting generator of claim 4, wherein the composite material has a hoop oriented fiber pattern with angles oriented at about 75 degrees.

7. The superconducting generator of claim 1, wherein the segmented sections each comprises a flat plate.

8. The superconducting generator of claim 1, wherein the segmented sections each comprises an arcuate plate.

9. The superconducting generator of claim 1, wherein the plurality of members separate from the flange and spaced apart circumferentially around the torque tube each comprises a straps.

10. The superconducting generator of claim 1, wherein the plurality of members separate from the flange and spaced apart circumferentially around the torque tube comprises a space frame or a strut assembly.

11. A wind turbine comprising:
a tower;
a nacelle mounted on top of the tower;
a hub connected to the nacelle and supported by the tower;
a plurality of blades connected to the hub;
a superconducting generator housed within the nacelle, the superconducting generator comprising:
an annular armature connectable to rotate with the hub;
a stationary annular field winding coaxial to the armature and separated by a gap from the armature, wherein the field winding includes superconducting coils;
a non-rotating support for the field winding, the non-rotating support comprising a torque tube, the torque tube comprised of:
a plurality of segmented sections joined together;
a flange located on at least one axial end of the torque tube; and
wherein the torque tube is connected to a thermal shield casing or a field winding housing by a plurality of members separate from the flange and spaced apart circumferentially around the torque tube.

12. The wind turbine of claim 11, wherein the torque tube comprises a generally cylindrical shaped member.

13. The wind turbine of claim 11, wherein the torque tube comprises a frustoconical shaped member.

14. The wind turbine of claim 11, wherein the segmented sections are formed of a composite material, and the composite material is mixtures of or one of:
- a fiber reinforced plastic;
- an epoxy fiberglass laminate;
- a phenolic fiberglass laminate;
- a phenolic fiberglass with wound filaments;
- a polyester fiberglass laminate;
- a polyester fiberglass laminate with wound filaments;
- a polymide fiberglass laminate;
- a carbon epoxy; or
- a fiberglass epoxy laminate.

15. The wind turbine of claim 14, wherein the composite material has a hoop oriented fiber pattern with angles oriented at about 65 degrees to about 85 degrees.

16. The wind turbine of claim 14, wherein the composite material has a hoop oriented fiber pattern with angles oriented at about 75 degrees.

17. The wind turbine of claim 11, wherein the segmented sections each comprises a flat plate.

18. The wind turbine of claim 11, wherein the segmented sections each comprises an arcuate plate.

19. The wind turbine of claim 11, wherein the plurality of members separate from the flange and spaced apart circumferentially around the torque tube comprises a straps.

20. The wind turbine of claim 11, wherein the plurality of members separate from the flange and spaced apart circumferentially around the torque tube comprises a space frame or a strut assembly.

* * * * *